United States Patent
Wang et al.

(10) Patent No.: US 12,086,609 B2
(45) Date of Patent: Sep. 10, 2024

(54) METHOD AND DEVICE FOR LOADING MODULE OF VIRTUAL REALITY EQUIPMENT BASED ON COMPUTER TERMINAL

(71) Applicant: GoerTek Technology Co., Ltd., Shandong (CN)

(72) Inventors: Chen Wang, Shandong (CN); Min Dai, Shandong (CN); Bin Jiang, Shandong (CN); Xiaoyu Chi, Shandong (CN)

(73) Assignee: Goertek Technology Co., Ltd., Shandong (CN)

( * ) Notice: Subject to any disclaimer, the term of this patent is extended or adjusted under 35 U.S.C. 154(b) by 328 days.

(21) Appl. No.: 17/442,794

(22) PCT Filed: Sep. 26, 2019

(86) PCT No.: PCT/CN2019/108244
§ 371 (c)(1),
(2) Date: Sep. 24, 2021

(87) PCT Pub. No.: WO2021/051440
PCT Pub. Date: Mar. 25, 2021

(65) Prior Publication Data
US 2022/0229670 A1   Jul. 21, 2022

(30) Foreign Application Priority Data
Sep. 20, 2019   (CN) .................. 2019 10893712.3

(51) Int. Cl.
*G06F 9/4401* (2018.01)
*G06F 11/07* (2006.01)

(52) U.S. Cl.
CPC ........ *G06F 9/4411* (2013.01); *G06F 11/0745* (2013.01); *G06F 11/0769* (2013.01)

(58) Field of Classification Search
CPC ....................................................... G06F 3/011
See application file for complete search history.

(56) References Cited

U.S. PATENT DOCUMENTS

| 2007/0081508 A1* | 4/2007 | Madhavan | H04L 67/14 713/168 |
| 2019/0186951 A1* | 6/2019 | Edwards | G06F 16/951 |

* cited by examiner

Primary Examiner — Henry Tsai
Assistant Examiner — Juanito C Borromeo
(74) *Attorney, Agent, or Firm* — Baker Botts LLP (57) ABSTRACT

Embodiments of the present application disclose a method and a device for loading module of virtual reality equipment based on PC terminal. The virtual reality equipment is in communication connection with the PC terminal, and comprises a plurality of functional devices and functional modules corresponding to the functional devices; and the PC terminal comprises experience modules corresponding to the functional devices. The method comprises: step one, sequentially performing a loading operation on each of P functional devices, P being a positive integer, wherein the loading operation comprises: determining whether the functional devices are valid; if so, loading the functional modules corresponding to the functional devices and recording valid information; step two, collecting M pieces of valid information, wherein the M pieces of valid information correspond to M functional devices which are determined to be valid among the P functional devices, M being a positive integer which is no greater than P; and step three, sending the M pieces of valid information to the PC terminal, thereby the PC terminal loading experience modules corresponding to the M functional devices according to the M pieces of valid information.

10 Claims, 4 Drawing Sheets

METHOD AND DEVICE FOR LOADING MODULE OF VIRTUAL REALITY EQUIPMENT BASED ON COMPUTER TERMINAL

CROSS-REFERENCE TO RELATED APPLICATION

This application claims the priority to Chinese Patent Application 201910893712.3, filed on Sep. 20, 2019 in the China National Intellectual Property Administration and entitled "Method and Device for Loading Module of Virtual Reality Equipment Based on PC Terminal", the disclosure of which is incorporated herein in its entirety by reference.

TECHNICAL FIELD

The present application relates to the technical field of virtual reality, more particularly, relates to a method and device for loading module of virtual reality equipment based on PC terminal, and a computer storage medium.

BACKGROUND

At present, in order to guarantee that VR (Virtual Reality) equipment achieves different functions, the VR equipment includes functional devices such as a screen, an audio apparatus, a proximity sensor, an inertial measurement unit, a camera, and the like; and when the VR equipment is started, modules corresponding to the respective functional devices need to be loaded to achieve control over the respective functional devices.

However, in the prior art, similar to starting of common electronic equipment such as a mobile phone, a computer, and the like, when the VR equipment is started, a module corresponding to each functional device is loaded in a unified manner in response to an instruction for loading a functional module, resulting in large power consumption of the VR equipment. Moreover, missing of part of the functional devices of the VR equipment or malfunction of part of the functional components may cause failure of a loading process of the whole module and make the VR equipment unusable.

When a user experiences the VR equipment matching with PC terminal, missing of part of the functional devices of the VR equipment or malfunction of part of the functional components may also cause failure of a loading process of a corresponding experience module of the PC terminal and affect the use of the user.

SUMMARY

A purpose of the present application is to provide a novel technical solution for loading module of virtual reality equipment based on PC terminal.

According to a first aspect of the present application, a method for loading module of virtual reality equipment based on PC terminal is provided, the virtual reality equipment is in communication connection with the PC terminal, wherein the virtual reality equipment includes a plurality of functional devices and functional modules corresponding to the functional devices, and the PC terminal includes experience modules corresponding to the functional devices; the method includes:

Step one, sequentially performing a loading operation on each of P functional devices, P being a positive integer;
Wherein the loading operation includes:

Determining whether a functional device is valid; and
If so, loading functional module corresponding to the functional device and recording valid information;
Step two, collecting M pieces of valid information, wherein the M pieces of valid information correspond to M functional devices which are determined to be valid among the P functional devices, M being a positive integer which is no greater than P;
Step three, sending the M pieces of valid information to the PC terminal, thereby the PC terminal loading the experience modules corresponding to the M functional devices according to the M pieces of valid information.

Alternatively or preferably, the functional device is provided with a register, and determining whether the functional device is valid includes:

Reading the register of the functional device to acquire a returned value;
Comparing the returned value with an initial value to determine whether the returned value is consistent with the initial value, wherein the initial value is a value written in the corresponding register when the functional device leaves the factory;
Determining that the functional device is valid when the returned value is consistent with the initial value.

Alternatively or preferably, the loading operation further includes:

Determining that the functional device is invalid;
Abandoning loading of the functional device and recording invalid information;
The method further includes:
Collecting N pieces of invalid information, wherein the N pieces of invalid information correspond to N functional devices which are determined to be invalid among the P functional devices, and N=P−M; and
Sending the N pieces of invalid information to the PC terminal, thereby the PC terminal abandoning the loading of the experience modules corresponding to the N functional devices according to the N pieces of invalid information.

Alternatively or preferably, the method further includes: recommending target experience content to a user according to the invalid information, wherein an experience process of the target experience content is irrelevant with the functional modules corresponding to the invalid information.

Alternatively or preferably, after determining that the functional device is invalid, the method further includes:

Sending prompt information to a user that the functional device is invalid.

Alternatively or preferably, the step three includes:

Sending the M pieces of valid information to the PC terminal, thereby the PC terminal loading the experience modules corresponding to O functional devices according to the M pieces of valid information, wherein the O functional devices are selected from the M functional devices by the user.

Alternatively or preferably, the functional devices include a display screen, an audio apparatus, a sensor, an inertial measurement unit, and a camera.

Alternatively or preferably, the experience modules are application programs.

According to a second aspect of the present application, virtual reality equipment is provided, comprising:

A plurality of functional devices;
A memory for storing computer instructions; and
A processor for calling the computer instructions from the memory, and executing a method for loading module of virtual reality equipment based on PC terminal provided by the first aspect of the present application under the control of the computer instructions.

According to a third aspect of the present application, a computer storage medium having executable computer instructions stored thereon is provided, wherein the executable computer instructions are configured for, when being executed by a processor, implementing a method for loading module of virtual reality equipment based on PC terminal provided by the first aspect of the present application.

According to a method for loading module of virtual reality equipment based on PC terminal provided by one embodiment of the present disclosure, a loading operation corresponding to each functional device is mutually independent, and functional modules or experience modules corresponding to part of the functional devices may be independently loaded or selectively loaded, thereby avoiding a phenomenon that the virtual reality equipment cannot be used due to loading failure of part of the functional modules; the functional diversity of the virtual reality equipment is improved, the virtual reality equipment may also be used even when abnormal, and the power consumption of the whole machine is reduced when abnormality occurs.

BRIEF DESCRIPTION OF THE DRAWINGS

To illustrate the embodiments of the present application or the technical solutions in the prior art more clearly, the drawings required to be used in the description of the embodiments or the prior art will be briefly introduced below. Apparently, the drawings in the following description are merely a part of the drawings of the present application. For a person of ordinary skill in the art, other relevant drawings may be obtained according to the provided drawings without creative efforts.

DETAILED DESCRIPTION

The technical solutions in the embodiments of the present application will be described below with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.
<Hardware Configuration>

Figure 1:
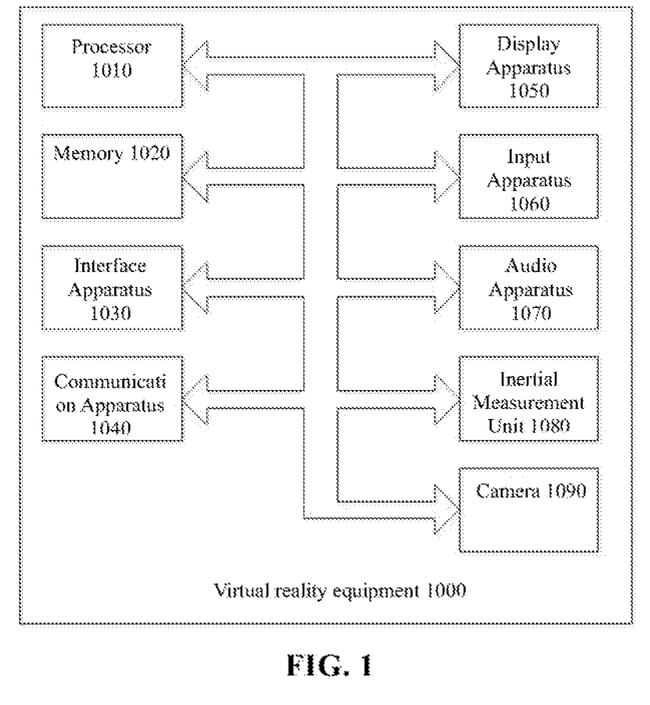
FIG. 1 shows a hardware configuration diagram of virtual reality equipment provided by an embodiment of the present application.

As shown in FIG. 1, a hardware configuration diagram of virtual reality equipment 1000 is provided by an embodiment of the present application.

The virtual reality equipment 1000 is in communication connection with a PC (personal computer) terminal, and the virtual reality equipment 1000 may be, for example, a virtual helmet. The PC terminal refers to a computer capable of directly sending manipulation commands.

The virtual reality equipment 1000 includes a plurality of functional devices which are correspondingly provided with registers.

The functional devices may be, for example, a display screen, an audio apparatus, a proximity sensor, an inertia measurement unit, or a camera.

Corresponding initial values may be written in the registers when the functional devices leave the factory, the registers may be a register built in the corresponding functional device, and may also be an external register, for example, a Read-Only register built in the functional device.

The virtual reality equipment includes functional modules corresponding to the functional devices, and the functional modules may be used for controlling the corresponding functional devices; and the functional modules may be, for example, a module for controlling the display screen, a module for controlling the audio apparatus, a module for controlling the proximity sensor, a module for controlling the inertial measurement unit, and a module for controlling the camera.

In one example, the virtual reality equipment 1000 may be as shown in FIG. 1, comprising a processor 1010, a memory 1020, an interface apparatus 1030, a communication apparatus 1040, a display apparatus 1050, an input apparatus 1060, an audio apparatus 1070, an inertial measurement unit 1080, a camera 1090, and the like.

Wherein the processor 1010, for example, may be a central processing unit CPU, a micro-controller unit MCU, and the like. The memory 1020, for example, comprises a ROM (Read-Only Memory), a RAM (Random Access Memory), a non-volatile memory such as a hard disk, and the like. The interface apparatus 1030, for example, includes a USB interface, a serial interface, an infrared interface, and the like. The communication apparatus 1040, for example, may perform wired or wireless communication. The display apparatus 1050, for example, is a liquid crystal display, an LED screen, a touch display screen, and the like. The input apparatus 1060, for example, includes a touch screen, a keyboard, somatosensory input, and the like. The audio apparatus 1070 may be used for inputting/outputting voice information. The inertial measurement unit 1080 may be used for measuring posture changes of the virtual reality equipment 1000. The camera 1090 may be used for acquiring image information.

Although a plurality of apparatuses are shown tor the virtual reality equipment 1000 in FIG. 1, the present application may refer only to some of the apparatuses, for example, the virtual reality equipment 1000 refers only to the memory 1020 and the processor 1010.

In above description, the skilled person may design instructions in accordance with the solution provided by the present disclosure. How the instructions control the processor to operate is well known in the art and will not be described in detail herein. The virtual reality equipment shown in FIG. 1 is merely explanatory and is in no way intended to limit the present disclosure, application or use thereof.
<Method for Loading Module of Virtual Reality Equipment Based on PC Terminal>

The embodiment provides a method for loading module of virtual reality equipment based on PC terminal. The method is implemented by the above virtual reality equipment. From the above description of the hardware configuration of the virtual reality equipment, it can be known that the virtual reality equipment includes a plurality of functional devices, and the functional devices are correspondingly provided with registers.

Figure 2:
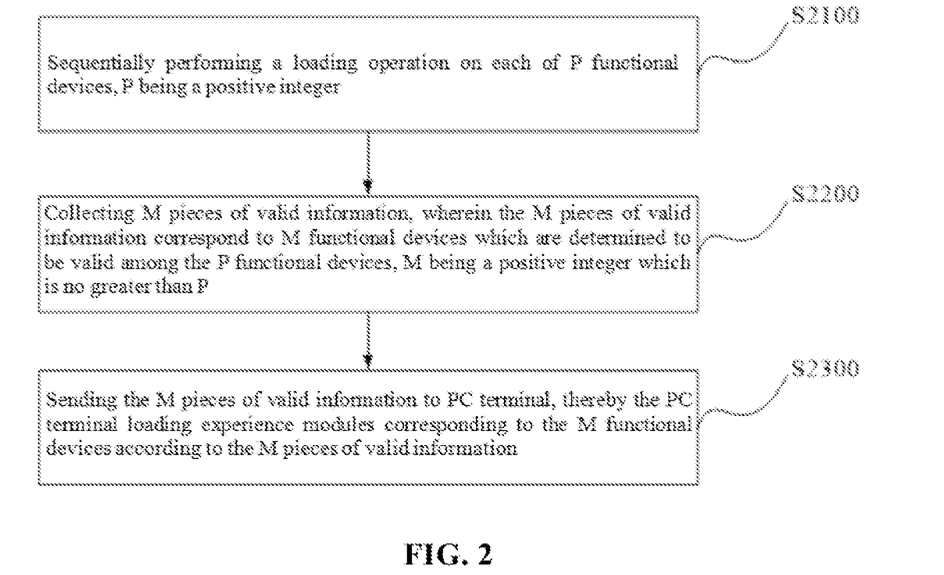
FIG. 2 shows a flow diagram of a method for loading module of virtual reality equipment based on PC terminal in accordance with an embodiment of the present application.

As shown in FIG. 2 the method for loading module of the virtual reality equipment based on the PC terminal may include the following steps S2100-S2300.

Step S2100, sequentially performing a loading operation on each of P functional devices, P being a positive integer;

In this embodiment, the functional devices may be apparatuses for achieving functions of the virtual reality equipment, the functional devices are correspondingly provided with registers, and may be a display screen, an audio apparatus, a proximity sensor, an inertial measurement unit, or a camera.

In this embodiment, the loading operation includes steps S2110-S2120.

In this example, the functional devices of the virtual reality equipment are correspondingly provided with the registers. The registers may be used for storing information for representing the functional devices, corresponding initial values may be written in the registers when the functional devices leave the factory, the registers may be a register built in the corresponding functional device, and may also be an external register, for example, a Read-Only register built in the functional device.

A returned value of the register is acquired by reading the register corresponding to the functional device, and in combination with subsequent steps, whether the corresponding functional device is valid is determined according to the returned value, the unified loading of the functional module corresponding to each functional device is avoided, the power consumption of the equipment can be reduced, and a situation that the use of a user is affected due to failure of a loading process of the whole modules caused by abnormity (i.e., invalidity) of part of the functional devices may be avoided.

Step S2110, determining whether a functional device is valid;

Determining whether the functional device is valid is determining whether the function of the functional device is normal, the validity of the functional device refers to a situation in which the function of the functional device is normal, and the invalidity of the functional device refers to a situation in which the functional device is in a fault state or missing state.

In a specific example, determining whether a functional device is valid includes steps S2111-S2113.

Step S2111, reading a register of the functional device to acquire a returned value.

The returned value is the data which is pre-stored in the register obtained by reading the register of the functional device by the virtual reality equipment. The returned value may denote whether the functional device corresponding to the register is valid.

Step S2112, comparing the returned value with an initial value to determine whether the returned value is consistent with the initial value.

The initial value is a value written in the corresponding register when the functional device leaves the factory. The initial value of the register of each functional device is fixed. For example, when the register is a Read-Only register, the virtual reality equipment may read the register but may not modify the initial value stored on the register, and credibility of determining whether the functional device is valid may be enhanced by reading the returned value of the register.

Step S2113, determining that the functional device is valid when the returned value is consistent with the initial value.

The consistence of the returned value and the initial value indicates that the function of the functional device corresponding to the register is normal, and the corresponding functional device is determined to be valid.

Whether the functional device corresponding to the register is valid may be determined by determining whether the acquired returned value is consistent with the initial value of the register, in addition, the initial value of the register is set to a fixed value, and the credibility of determining whether the functional device is valid may be enhanced by reading the returned value of the register, thereby selectively loading a corresponding functional module depending on whether the functional device is valid, power consumption of the equipment may be reduced, and user experience is improved.

Step S2120, loading functional module corresponding to the functional device and recording valid information if the returned value is consistent with the initial value.

The functional modules are disposed correspondingly to the functional devices, and may be used for controlling the corresponding functional devices to work. The functional devices may be a display screen, an audio apparatus, a proximity sensor, an inertial measurement unit, or a camera; correspondingly, the functional modules may be a module for controlling the display screen, a module for controlling the audio apparatus, a module for controlling the proximity sensor, a module for controlling the inertial measurement unit, or a module for controlling the camera. For example, the functional module may be a control program of the functional device.

The valid information corresponds to validity of the functional device, and is used for indicating that the function of the corresponding functional device is normal.

Specifically, a returned value is acquired by reading a register of the functional device. If the returned value is consistent with an initial value, the functional device is valid, and the valid information corresponding to the functional device is set and stored. For example, the valid information is 1.

For example, taking determining whether an inertial measurement unit is valid as an example, a returned value is acquired by reading a register of the inertial measurement unit. If the returned value is consistent with the initial value, the inertial measurement unit is valid, and the valid information corresponding to the inertial measurement unit is set to 1 and stored in a memory of the virtual reality equipment.

When determining that the functional device is valid, the valid information of the functional device is recorded and stored, so that the PC terminal can directly read the valid information when the virtual reality equipment communicates with the PC terminal, a corresponding module is loaded according to the valid information, the PC terminal does not need to read the register of the functional device, the PC terminal is prevented from determining again, the loading efficiency is improved, and the use is convenient for a user.

Step S2200 is performed after sequentially performing the loading operation on the P functional devices;

Step S2200, collecting M pieces of valid information, wherein the M pieces of valid information correspond to M functional devices which are determined to be valid among the P functional devices, M being a positive integer which is no greater than P;

For example, the virtual reality equipment is provided with five functional devices, comprising a display screen, an audio apparatus, a proximity sensor, an inertial measurement unit, and a camera. If it is determined that a returned value of the display screen is consistent with an initial value, the display screen is valid, and valid information corresponding to the display screen is set to 1 and stored in the memory of the virtual reality equipment; if it is determined that a returned value of the audio apparatus is consistent with an initial value, the audio apparatus is valid, and valid information corresponding to the audio apparatus is set to 1 and stored in the memory of the virtual reality equipment; if it is determined that a returned value of the proximity sensor is consistent with an initial value, the proximity sensor is valid, and valid information corresponding to the proximity sensor is set to 1 and stored in the memory of the virtual reality equipment; and the three pieces of valid information are collected, and correspond to the display screen, the audio apparatus and the proximity sensor respectively.

Step S2300 is performed after collecting the M pieces of valid information;

Step S2300, sending the M pieces of valid information to the PC terminal, thereby the PC terminal loading experience modules corresponding to the M functional devices according to the M pieces of valid information.

In a specific example, the step S2300 may further include: sending the M pieces of valid information to the PC terminal, thereby the PC terminal loading experience modules corresponding to O functional devices according to the M pieces of valid information, wherein the O functional devices are selected from the M functional devices.

The experience modules may be application programs, for example, a music player, a video player, and the like.

For example, the virtual reality equipment is provided with five functional devices, comprising a display screen, an audio apparatus, a proximity sensor, an inertial measurement unit, and a camera. If it is determined that the display screen, the audio apparatus, and the proximity sensors are valid, the three pieces of valid information are collected, and correspond to the display screen, the audio apparatus and the proximity sensor respectively; the three pieces of valid information are sent to the PC terminal, thereby the PC terminal loading experience modules corresponding to the three functional devices of the display screen, the audio apparatus and the proximity sensor according to three pieces of valid information, for example, an experience module for watching films and television.

In one example, the loading operation further includes steps S2130-S2140.

Step S2130, determining that a functional device is invalid;

The invalidity of the functional device means that the functional device is in a fault state or missing state.

Step S2140, abandoning loading of the functional device and recording invalid information;

The invalid information corresponds to the invalidity of the functional device, and is used for indicating that the corresponding functional device is in the fault state or the missing state.

Specifically, a returned value is acquired by reading a register of the functional device. If the returned value is inconsistent with an initial value, the functional device is invalid, and the valid information corresponding to the functional device is set and stored. For example, the invalid information is 0.

For example, taking determining whether an audio apparatus is valid as an example, the returned value is acquired by reading a register of the audio apparatus. If the returned value is inconsistent with an initial value, the audio apparatus is invalid, and the invalid information corresponding to the audio apparatus is set to 0 and stored in the memory of the virtual reality equipment.

When determining that the functional device is invalid, the loading of a functional module corresponding to the functional device is abandoned, thereby avoiding a phenomenon that the virtual reality equipment cannot be used due to failure of the loading of part of the functional modules; the virtual reality equipment may also be used even when abnormal, and the power consumption of the whole machine is reduced when abnormality occurs.

In one example, after determining that the functional device is invalid, the method further includes:

Sending prompt information to a user that the functional device is invalid.

The invalid information of the functional device is recorded and stored, so that the PC terminal may directly read the invalid information when the virtual reality equipment communicates with the PC terminal, and reminding that the corresponding functional device is in the abnormal state may be fed back to the user through the PC terminal, components which may be in malfunction can be accurately positioned when the virtual reality equipment is abnormal, and maintenance of the virtual reality equipment is facilitated.

In this example, the method for loading module of virtual reality equipment based on PC terminal further includes steps S2400-S2500.

Step S2400, collecting N pieces of invalid information, wherein the N pieces of invalid information correspond to N functional devices which are determined to be invalid among the P functional devices, and N=P−M;

For example, the virtual reality equipment is provided with five functional devices, comprising a display screen, an audio apparatus, a proximity sensor, an inertial measurement unit, and a camera. If it is determined that the display screen, the audio device and the inertial measurement unit are valid, the proximity sensor and the camera are invalid; three pieces of valid information and two pieces of invalid information are collected, the three pieces of valid information correspond to the display screen, the audio device and the inertial measurement unit respectively, and the two pieces of invalid information correspond to the proximity sensor and the camera respectively.

Step S2500, sending the N pieces of invalid information to the PC terminal, thereby the PC terminal abandoning the loading of the experience modules corresponding to the N functional devices according to the N pieces of invalid information.

After determining that the functional devices are invalid, the PC terminal abandons the loading of the experience modules corresponding to the N functional devices according to the N pieces of invalid information, thereby avoiding a phenomenon that the virtual reality equipment cannot be matched with the PC terminal for use due to failure of the loading of part of the functional modules; and the virtual reality equipment may also be used even when abnormal, and the power consumption of the whole machine is reduced when abnormality occurs.

In a more specific embodiment, after the step S2400, the method further includes:

Recommending target experience content to the user according to the invalid information, wherein the experience process of the target experience content is irrelevant with the functional modules corresponding to the invalid information.

For example, the functional devices of the virtual reality equipment include a display screen, an audio apparatus, a proximity sensor, an inertial measurement unit, or a camera.

If the inertial measurement unit (IMU) is invalid, the virtual reality equipment cannot feed back a head-wearing posture normally, the PC terminal pushes the target experience content for watching films and television to the user and loads an experience module for correspondingly achieving the function, and the target experience content is irrelevant with the functional module corresponding to the inertial measurement unit;

if the proximity sensor (psensor) is invalid, the virtual reality equipment cannot regulate on and off of a screen according to a wearing state of the user, the PC terminal pushes the target experience content for music type to the user and loads an experience module for correspondingly achieving the function, and reminds the user to unplug the equipment in time for power saving when the equipment is not used; and the target experience content is irrelevant with the functional module corresponding to the proximity sensor;

If the audio apparatus (audio) is invalid, the virtual reality equipment cannot output sound, the PC terminal pushes the target experience content for visual silent video to the user and loads an experience module for correspondingly achieving the function; and the target experience content is irrelevant with the functional module corresponding to the audio apparatus.

If the display screen (display) is invalid, the virtual reality equipment cannot display images normally, the PC terminal pushes the target experience content for music type to the user and loads an experience module for correspondingly achieving the function; and the target experience content is irrelevant with the functional module corresponding to the display screen.

If the camera is invalid, the virtual reality equipment cannot be positioned through the camera, the PC terminal pushes audio-visual target experience content to the user and loads an experience module for correspondingly achieving the function; and the target experience content is irrelevant with the functional module corresponding to the camera.

The target experience content is recommended to the user according to the invalid information, the diversity of the virtual reality equipment is improved, the virtual reality equipment may also be used even when abnormal, and the power consumption of the whole machine is reduced when abnormality occurs.

According to a method for loading module of virtual reality equipment based on PC terminal provided by embodiments of the present application, a loading operation corresponding to each functional device is mutually independent, and functional modules or experience modules corresponding to part of the functional devices may be independently loaded or selectively loaded, thereby avoiding a phenomenon that the virtual reality equipment cannot be used due to failure of loading of part of the functional modules; the functional diversity of the virtual reality equipment is improved, the virtual reality equipment may also be used even when some functional devices are abnormal.

In addition, compared with a technical solution of loading all functional devices in a unified manner after the virtual reality equipment is powered on in the prior art, a method for loading module of virtual reality equipment based on PC terminal provided by embodiments of the present application may selectively load required functional devices according to experience demands of a user; and the whole module loading process of the equipment may be accelerated while excellent user experience is guaranteed, and the power consumption of the whole machine is reduced.

Example

Figure 3:
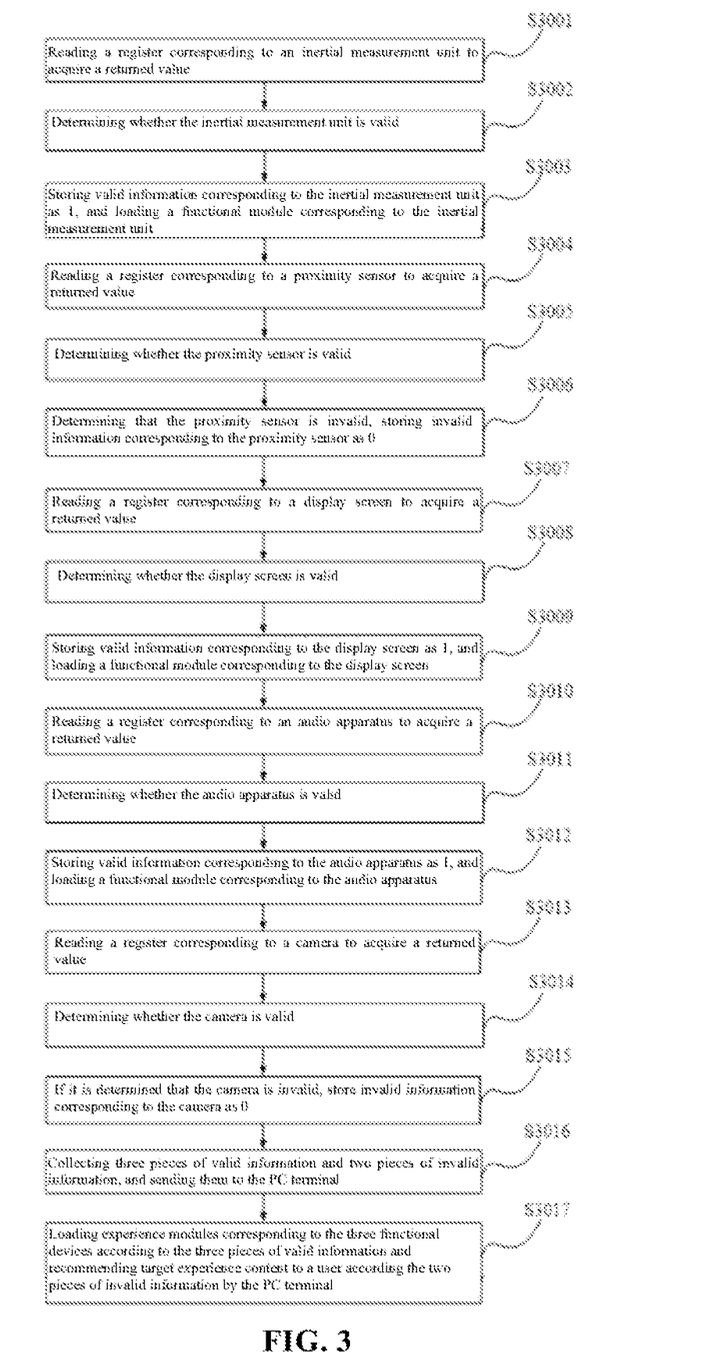
FIG. 3 shows a flow diagram of a method for loading module of virtual reality equipment based on PC terminal in accordance with one example of the present application.

A method for loading module of virtual reality equipment based on PC terminal provided in the embodiment will be further described below with reference to the FIG. 3.

In this example, functional devices include a display screen, an audio apparatus, a proximity sensor, an inertial measurement unit, and a camera.

The method for loading module of virtual reality equipment may include the following steps:

Step S3001, reading a register corresponding to the inertial measurement unit to acquire a returned value;

Step S3002, determining whether the inertial measurement unit is valid according to the returned value;

Step S3003, determining that the inertial measurement unit is valid, storing valid information corresponding to the inertial measurement unit as 1, and loading a functional module corresponding to the inertial measurement unit;

Step S3004, reading a register corresponding to the proximity sensor to acquire a returned value;

Step S3005, determining whether the proximity sensor is valid according to the returned value;

Step S3006, determining that the proximity sensor is invalid, and storing invalid information corresponding to the proximity sensor as 0;

Step S3007, reading a register corresponding to the display screen to acquire a returned value;

Step S3018, determining whether the display screen is valid according to the returned value;

Step S3009, determining that the display screen is valid, storing valid information corresponding to the display screen as 1, and loading a functional module corresponding to the display screen:

Step S3010, reading a register corresponding to the audio apparatus to acquire a returned value;

Step S3011, determining whether the audio apparatus is valid according to the returned value;

Step S3012, determining that the audio apparatus is valid, storing valid information corresponding to the audio apparatus as 1, and loading a functional module corresponding to the audio apparatus;

Step S3013, reading a register corresponding to the camera to acquire a returned value;

Step S3014, determining whether the camera is valid according to the returned value;

Step S3015, determining that the camera is invalid, and storing invalid information corresponding to the camera as 0;

Step S3016, collecting above three pieces of valid information (corresponding to three functional devices of the inertial measurement unit, the display screen and the audio apparatus respectively) and above two pieces of invalid information (corresponding to two functional devices of the proximity sensor and the camera respectively), and sending them to PC terminal;

And step S3017, loading experience modules (corresponding to three functional devices of the inertial measurement unit, the display screen and the audio apparatus respectively) corresponding to the three functional devices according to the three pieces of valid information and recommending target experience content to a user according to the two pieces of invalid information (corresponding to two functional devices of the proximity sensor and the camera respectively) by the PC terminal.

In this example, steps S3001-S3003, steps S3004-S3006, steps S3007-S3009, steps S3010-S3012, and steps S3013-S3015 are executed in no order.

<Virtual Reality Equipment>

Figure 4:
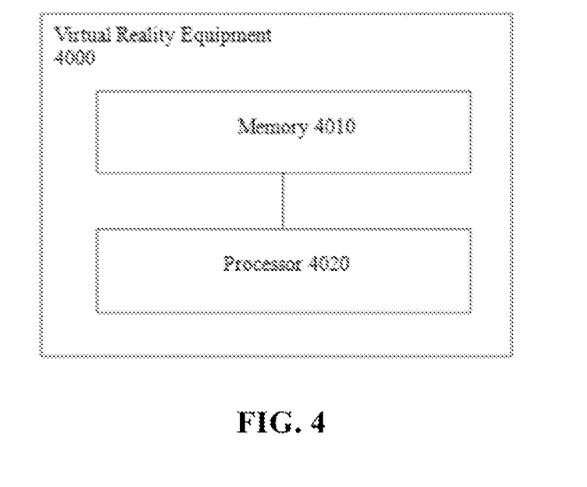
FIG. 4 shows a hardware structure diagram of virtual reality equipment in accordance with an embodiment of the present application.

An embodiment of the present application further provides virtual reality equipment 4000; as shown in FIG. 4, the virtual reality equipment includes:

A plurality of functional devices;

A memory 4010 capable of storing computer instructions;

And a processor 4020 capable of calling the computer instructions from the memory 4010 and executing the method for loading module of virtual reality equipment based on PC terminal provided by the above embodiments under the control of the computer instructions.

In one example, the virtual reality equipment 1000 may be connected with the PC terminal, and the virtual reality equipment 1000 may be, for example, a virtual helmet. The PC (personal computer) terminal refers to a computer capable of directly sending manipulation commands.

The functional devices may be, for example, a display screen, an audio apparatus, a proximity sensor, an inertia measurement unit, or a camera.

<Computer Storage Medium>

An embodiment of the present application further provides a computer storage medium having executable computer instructions stored thereon, wherein the executable computer instructions may achieve the method for loading module of virtual reality equipment based on PC terminal provided by the above embodiments when being executed by a processor.

Specifically, the above embodiments of the method for loading module of virtual reality equipment based on PC terminal may be used for explaining the computer storage medium of this embodiment, which will not be described in this embodiment of the computer storage medium.

Various embodiments described above mainly focus on the differences from other embodiments, but it should be clear to those skilled in the art that various embodiments described above may be used alone or in combination with each other as desired.

Various embodiments in this specification are described in a parallel or progressive manner, with each embodiment focusing on the differences from other embodiments, and the like or similar parts between various embodiments may be referred to each other. As the apparatus disclosed in the embodiment corresponds to the method disclosed in the embodiment, the description is relatively simple, and the relevant points may be referred to the description of the method.

A person of ordinary skill in the art may appreciate that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

The steps of the method or algorithm described in combination with the embodiments disclosed herein may be implemented directly by hardware, a software module executed by a processor, or a combination thereof. Software module may be placed in a Random Access Memory (RAM), a memory, a Read Only Memory (ROM), an electrically programmable ROM, an electrically erasable programmable ROM, registers, a hard disk, a removable disk, a CD-ROM, or any other form of storage medium known in the art.

It should be noted that relational terms such as "first" and "second" are only used to differ an entity or operation from another entity or operation in this specification, and do not require or imply any real relationship or sequence among these entities or operations. Furthermore, terms "comprise", "contain" or any of their derivatives are intended to cover a non-exclusive connotation, so that a process, a method, an article or equipment including a series of elements not only comprises such elements, but also comprises other elements that are not listed explicitly, or further comprises inherent elements of the process, the method, the article or the device. If no more limitations are made, an element limited by "comprising a/an . . . " does not exclude another same element existing in the process, the method, the article, or the equipment that comprises the element.

The invention claimed is:

1. A method for loading a module of virtual reality equipment based on a Computer terminal, the virtual reality equipment being in communication connection with the computer terminal, wherein the virtual reality equipment comprises a plurality of functional devices and functional modules corresponding to the functional devices, and the computer terminal comprises experience modules corresponding to the functional devices; the method comprising:

sequentially performing a loading operation on each of P functional devices, P being a positive integer, comprising determining whether a functional device is valid, and if the functional device is valid, loading a functional module corresponding to the functional device and recording valid information;

collecting M pieces of valid information, wherein the M pieces of valid information correspond to M functional devices determined to be valid among the P functional devices, M being a positive integer which is no greater than P; and sending the M pieces of valid information to the computer terminal, thereby the computer terminal loading the experience modules corresponding to the M functional devices according to the M pieces of valid information.

2. The method according to claim 1, wherein the functional device is provided with a register, and the determining whether the functional device is valid comprises:

reading the register of the functional device to acquire a returned value;

comparing the returned value with an initial value to determine whether the returned value is consistent with the initial value, wherein the initial value is a value written in the corresponding register when the functional device leaves the factory;

and determining that the functional device is valid when the returned value is consistent with the initial value.

3. The method according to claim 1, wherein, the loading operation further comprises:

determining that a functional device is invalid; and abandoning the loading of the functional device to thereby avoid recording invalid information; and wherein the method further comprises:

collecting N pieces of invalid information, wherein the N pieces of invalid information correspond to N functional devices which are determined to be invalid among the P functional devices, wherein N=P−M; and sending the N pieces of invalid information to the computer terminal, thereby the computer terminal abandoning loading of the experience modules corresponding to the N functional devices according to the N pieces of invalid information.

4. The method according to claim 3, wherein the method further comprises:

recommending target experience content to a user according to the invalid information, wherein an experience process of the target experience content is irrelevant with the functional modules corresponding to the invalid information.

5. The method according to claim 3, wherein, after determining the functional device is invalid, the method further comprises:

sending prompt information to a user that the functional device is invalid.

6. The method according to claim 1, wherein the sending the M pieces of valid information to the computer terminal comprises:

sending the M pieces of valid information to the computer terminal, thereby the computer terminal loading experience modules corresponding to O functional devices according to the M pieces of valid information, wherein the O functional devices are selected from the M functional devices by the user.

7. The method according to claim 1, wherein the functional devices comprise a display screen, an audio apparatus, a sensor, an inertial measurement unit, and a camera.

8. The method according to claim 1, wherein the experience modules are application programs.

9. Virtual reality equipment, comprising:

a plurality of functional devices;

a memory for storing computer instructions; and a processor for calling the computer instructions from the memory and executing the method according to claim 1 for loading module of virtual reality equipment based on computer terminal under control of the computer instructions.

10. A non-transitory computer storage medium having executable computer instructions stored thereon, wherein the executable computer instructions are configured for, when being executed by a processor, implementing a method according to claim 1 for loading module of virtual reality equipment based on computer terminal.

* * * * *